United States Patent

Heinzmann

(10) Patent No.: US 6,837,327 B2
(45) Date of Patent: Jan. 4, 2005

(54) CONTROLLED BALANCING TOY

(75) Inventor: Richard K. Heinzmann, Francestown, NH (US)

(73) Assignee: DEKA Products Limited Partnership, Manchester, NH (US)

(*) Notice: Subject to any disclaimer, the term of this patent is extended or adjusted under 35 U.S.C. 154(b) by 8 days.

(21) Appl. No.: 10/159,700

(22) Filed: May 29, 2002

(65) Prior Publication Data

US 2002/0170754 A1 Nov. 21, 2002

Related U.S. Application Data

(63) Continuation-in-part of application No. 09/619,086, filed on Jul. 19, 2000, now abandoned, which is a continuation-in-part of application No. 09/325,976, filed on Jun. 4, 1999, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,639, filed on May 27, 1994, now Pat. No. 5,701,965, which is a continuation-in-part of application No. 08/021,789, filed on Feb. 24, 1993, now abandoned.

(51) Int. Cl.$^7$ ................................. A63H 17/00
(52) U.S. Cl. .................. 180/218; 180/282; 446/233
(58) Field of Search ........................... 180/7.1, 21, 218, 180/282; 446/233, 234, 237, 440, 468; 33/318

(56) References Cited

U.S. PATENT DOCUMENTS

| | | | | |
|---|---|---|---|---|
| 3,399,742 A | * | 9/1968 | Malick | 180/21 |
| 3,650,067 A | * | 3/1972 | Greenwood | 446/233 |
| 5,820,439 A | * | 10/1998 | Hair, III | 446/233 |
| 6,042,449 A | * | 3/2000 | Ishimoto | 446/234 |

FOREIGN PATENT DOCUMENTS

JP  404201793  * 7/1992 ................. 180/7.1

* cited by examiner

Primary Examiner—Lesley D. Morris
Assistant Examiner—Matthew Luby
(74) Attorney, Agent, or Firm—Bromberg & Sunstein LLP

(57) ABSTRACT

A balancing toy having a chassis and a pair of laterally disposed wheels coupled to the chassis for motor-driven rotation with respect to the chassis. A circuit governs wheel rotation to maintain balance of the toy on the basis of chassis tilt as measured by a sensor. The sensor may include a gyroscope, and the balancing toy may have a single motor driving both wheels, or separate motors driving each wheel.

6 Claims, 3 Drawing Sheets

CONTROLLED BALANCING TOY

The present application is a continuation-in-part of U.S. patent application Ser. No. 09/619,086, filed Jul. 19, 2000 now abandoned, which is, in turn, a continuation-in-part of U.S. Ser. No. 09/325,976, filed Jun. 4, 1999, which is, in turn, a continuation-in-part of U.S. Ser. No. 08/479,901 filed on Jun. 7, 1995, now issued as U.S. Pat. No. 5,975,225, itself a continuation-in-part of U.S. Ser. No. 08/384,705 filed on Feb. 3, 1995, now issued as U.S. Pat. No. 5,971,091, itself a continuation-in-pat of U.S. Ser. No. 08/250,693 filed on May 27, 1994, now issued as U.S. Pat. No. 5,701,965, itself a continuation-in-part of 08/021,789, filed Feb. 24, 1993 and now abandoned. All of these prior applications are incorporated herein by reference.

TECHNICAL FIELD

The present invention pertains to a mobile toy that locomotes in an operating position that is unstable with respect to fore/aft tipping when the toy is not powered.

BACKGROUND OF THE INVENTION

Various motorized two-wheeled toys have been described in the prior art, such as the radio-controlled motorcycle-like vehicle toy of Asano (U.S. Pat. No. 4,966,569) or the two-wheeled motorized toy of Wagstaff (U.S. Pat. No. 4,897,070). Such toys prevent tipping in a fore/aft direction either by placing the wheels in rotation about axes which are parallel and disposed one ahead of the other (as in a bicycle or scooter) or by placing the center of gravity (CG) of the chassis beneath the axis of rotation of the wheels (as in Wagstaff) so that no overturning torque may be developed. Stability with respect to lateral tipping of the in-line-wheel toys is maintained by virtue of rolling of the wheels about substantially horizontal axes, in accordance with well-known physical principles. Such operation can avail to maintain fore/aft stability of a toy vehicle only if points of contact between the toy and the underlying surface are separated along a direction parallel to the motion of the toy, i.e., the wheels are "in-line."

Toys are also known in which the toys are directly stabilized by mechanical action of a gyroscope. The "R/C UFO Buddies" currently sold by FAO Schwarz are examples of such toys.

SUMMARY OF THE INVENTION

In accordance with a preferred embodiment of the present invention, there is provided a balancing toy. The balancing toy has a chassis that may be characterized by an instantaneous tilt in a fore/aft plane with respect to a vertical direction and a pair of laterally disposed wheels coupled to the chassis for motor-driven rotation with respect to the chassis. The toy also has a sensor for measuring the tilt of the chassis and a circuit for governing wheel rotation to maintain balance of the toy on the basis of the tilt of the chassis.

In accordance with alternate embodiments of the invention, the balancing toy may also have a second sensor for measuring the angular rate of change of tilt of the chassis, and the second sensor may be a gyroscope. The balancing toy may have a single motor driving both wheels, or separate motors driving each wheel.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

Figure 1:
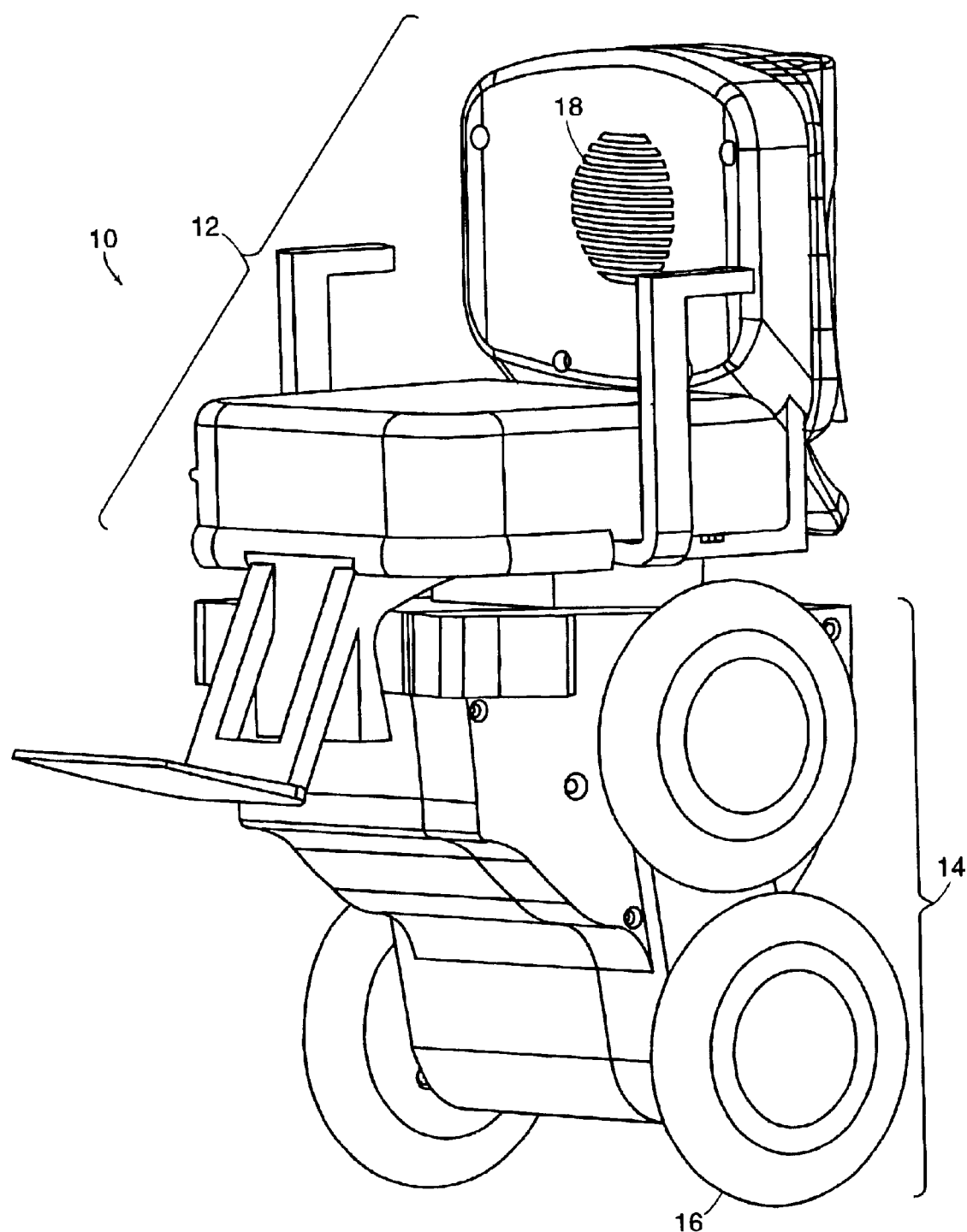
FIG. 1 is a perspective view of a balancing toy in accordance with a preferred embodiment of the invention.

Referring to FIG. 1, the fundamental parts of toy 10 may be considered, without limitation, to include a support 12, a chassis module 14 to which support 12 is attached, an actuator mechanism (not shown) for driving wheels 16 and/or clusters 14, a power supply, a circuit, described below, for governing the actuator mechanism, and sensors (not shown) that monitor the physical position and orientation in space of the toy as well as the measured time rates of change of the position and configuration of the toy. Support 12, while having the shape of a seat, is typically no larger than 5 cm. on a side, and is thus incapable of supporting a person. The circuit governs the actuator mechanism in accordance with desired parameters and in response to the output of the sensors. Specified control laws are described in U.S. Pat. No. 5,701,965 and U.S. patent application Ser. No. 08/384,705, and in the description below. In accordance with preferred embodiments of the invention, the power supply, including a battery, and circuit cards containing portions or all of the control circuit, are contained within support 12, as is speaker 18 for emitting sounds played by a speech module.

As used herein, the term 'toy' refers to a diminutive version of an article serving for amusement or entertainment. The term "position" of the toy is referred to some fiducial point fixed with respect to the surface over which the toy is locomoting, whereas "orientation" refers to the disposition of the toy with respect to an earth-fixed direction such as the local vertical. Displacement of the line connecting the center of gravity of the toy with the points of contact between the wheels and the underlying surface is referred to herein as the "tilt" of the toy. The term "wheels" may equivalently encompass arcuate elements or other ground-contacting members capable of propelling toy 10 across the floor or other surface. In particular, in accordance with alternate embodiments of the invention, wheels 16 may rotate about axles which may themselves be rotated about a cluster axle constituting an axis of cluster rotation. Other internal degrees of freedom which may be present in toy 10 are similarly encompassed within the scope of the term "configuration" as used herein and in any appended claims. Similarly, the angular orientation, or tilt, of toy 10 with respect to gravity is also encompassed within the scope of the term "configuration."

"Sensor" refers to any device for monitoring any characteristic of the physical position or configuration of the vehicle and may include, for example, an inclinometer for measuring tilt, gyroscopes, encoders for measuring the angular orientation or its rate of change for any of the wheels or clusters, etc. In a preferred embodiment of the invention, three sensors provide the feedback signals required for stabilization of the toy:

a. a tilt sensor;

b. an angular rate sensor; and c. a wheel drive position sensor.

Figure 2:
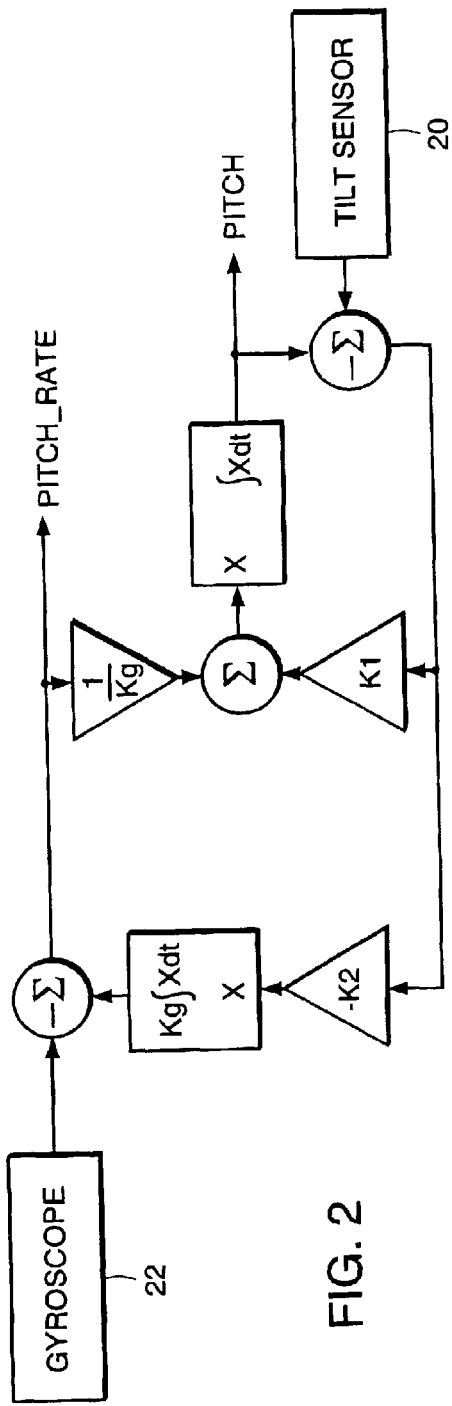
FIG. 2 is a block diagram representation of the inertial reference architecture for deriving the pitch and pitch rate of the toy of FIG. 1.

The outputs of a tilt sensor 20 and an angular rate sensor 22 are combined to provide a state estimate as shown in the diagrammatic representation of a state estimator circuit as shown in FIG. 2. Tilt sensor 20 is preferably an electrolytic, fluidic (pendulous) tilt sensor, however any tilt sensor that, on average, indicates the pitch of the body to which it is attached is within the scope of the present invention. Angular rate sensor 22 is preferably a piezoelectric vibrating beam type rate gyroscope, however, any angular rate sensor is within the scope of the present invention.

The state estimator circuit of FIG. 2 constitutes an inertial reference system for the toy, as now described. Signal outputs of gyroscope 22 and tilt sensor 20 are shifted into bipolar ranges about zero, and scaled to a desired sensitivity. The output of the tilt sensor is an imperfect indicator of instantaneous pitch because the tilt sensor is a damped pendulum and thus requires a finite response time to adjust to perturbations. Since low-pass filtering of the output is likely to provide inadequate bandwidth, the actual pitch is obtained by integrating the output of the angular rate sensor 22, and the output of the tilt sensor 20 is used to null the effects of integrator drift due to rate gyro offset.

Figure 3:
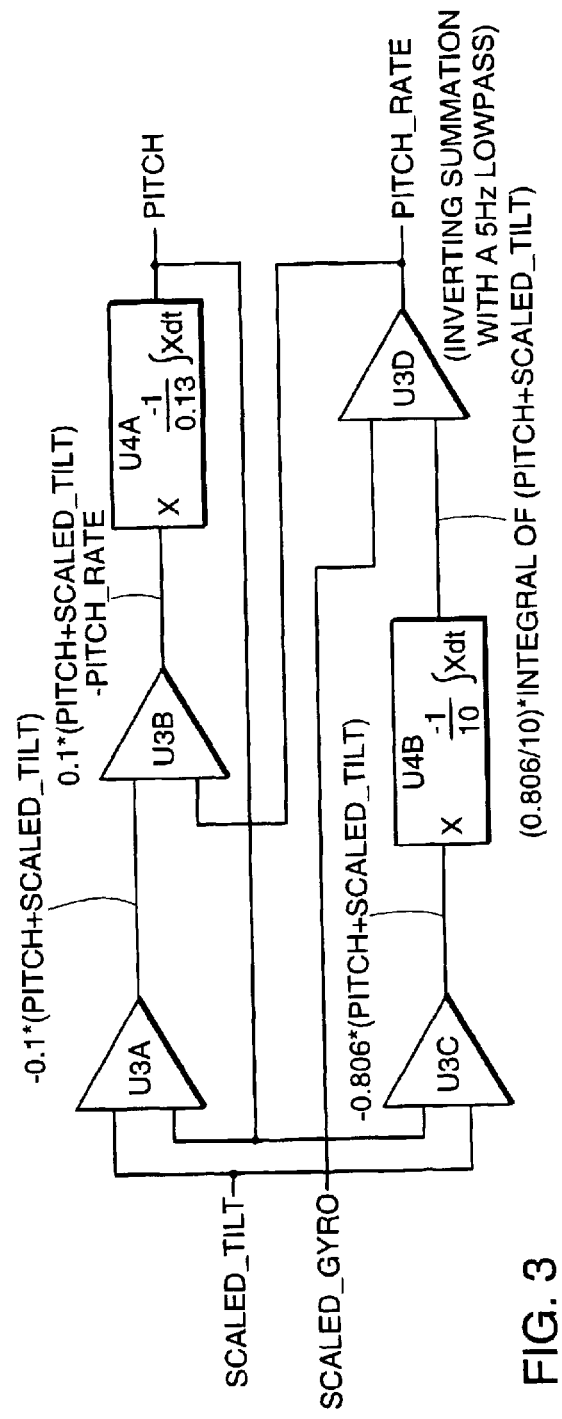
FIG. 3 is simplified diagram of a state estimator circuit in accordance with the diagram of FIG. 2.

The specific equations embodied by the diagram of FIG. 2 are:

$$\text{PITCH} \equiv \theta = -\frac{s\frac{\omega_m}{k_g} + \theta_m(k_1 s + k_2)}{s^2 + k_1 s + k_2}, \text{ and}$$

$$\text{PITCH\_RATE} \equiv \omega = -\omega_m - k_2 k_g \frac{(\theta + \theta_m)}{s},$$

where $\check{Z}_m$ and $4_m$ are the tilt and angular rate as measured by the tilt sensor and gyroscope, respectively, s is the complex frequency from Laplacian analysis, and the circuit parameters k are as shown in the diagram. An implementation of the circuit of FIG. 2 is shown in FIG. 3.

Figure 4:
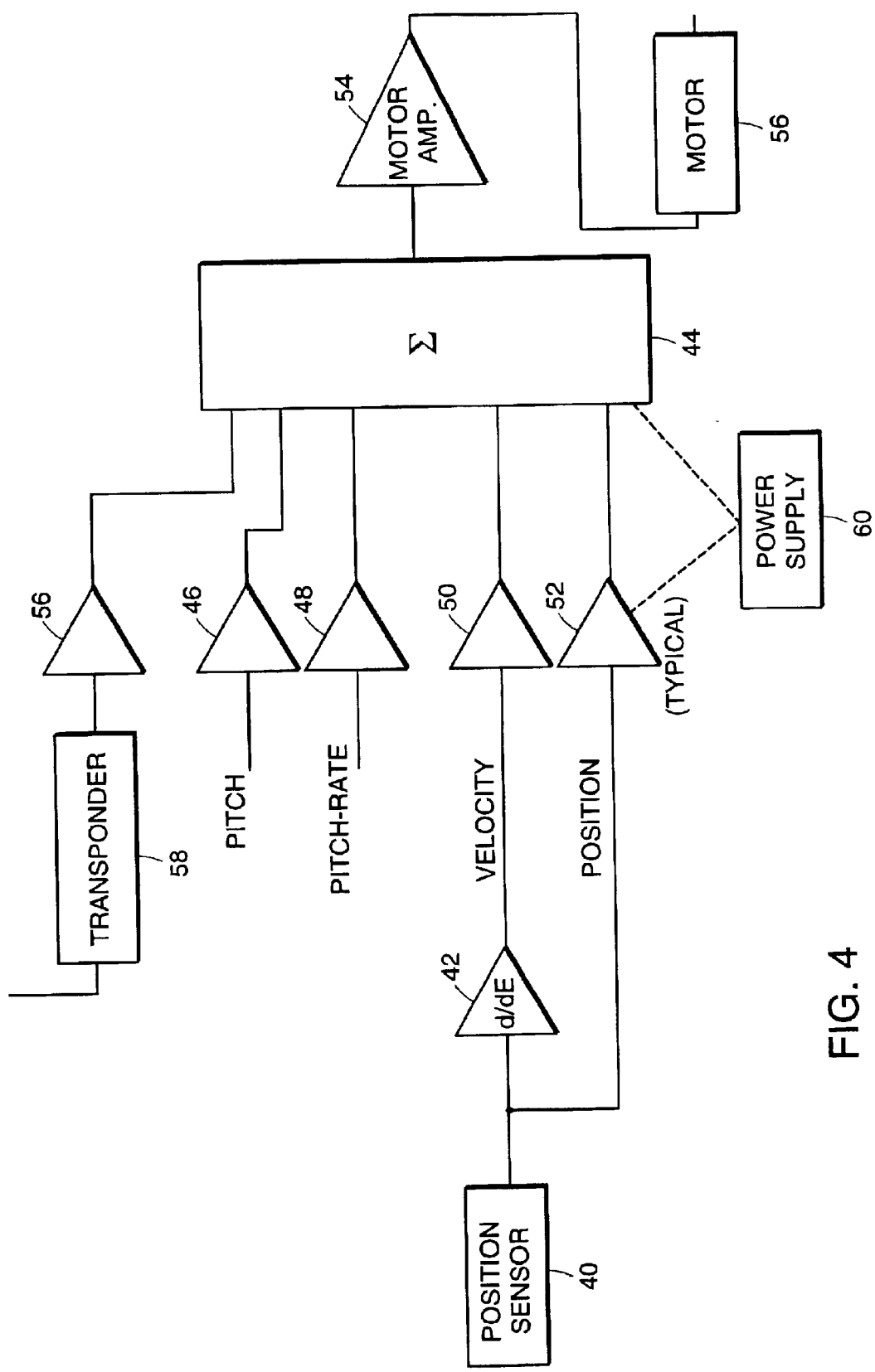
FIG. 4 is a block diagram representation of the control architecture for controlling the balance of the toy of FIG. 1.

The control of balance of the toy is now described with reference to FIG. 4. The output of position sensor 40 is differentiated by differentiator 42 to provide a velocity signal. Each of the four state variables (position, velocity, pitch, and pitch rate) are linearly combined, by summer 44 and with relative gains determined by amplifiers 46, 48, 50, and 52, in order to derive a signal for driving motor amplifier 54 which, in turn, supplies current to motor 56. Additionally, an additional input may be provided to summer 44, through amplifier 56 in order to permit motion to be commanded remotely and transmitted, via electromagnetic waves, to transponder 58. Power is provided to circuitry components by power supply 60.

In accordance with alternate embodiments of the invention, two motors may be provided, each motor separately driving a single wheel, so that by differential drive of the respective wheels, the toy may be steered. In yet further alternate embodiments of the invention, a speech module may be provided to play various sounds through speaker 18 (shown in FIG. 1) upon the occurrence of specified events or conditions, based on the outputs of the various sensors or otherwise.

It is understood that the analog control circuitry described herein is readily implemented by a controller having software equivalent to the described circuitry. Such embodiments are within the scope of the present invention and of such claims as appended hereto.

The power supply preferably includes one or more batteries and a charger. The actuator rotating the wheels is preferably a DC motor driven by a motor driver circuit including a class B amplifier with current limiting to prevent overheating and voltage limiting to prevent motor overspeed. The described embodiments of the invention are intended to be merely exemplary and numerous variations and modifications will be apparent to those skilled in the art. All such variations and modifications are intended to be within the scope of the present invention as defined in the appended claims.

What is claimed is:

1. A balancing toy comprising:
   a. a chassis incapable of supporting any person, the chassis characterized by an instantaneous tilt in a fore/aft plane with respect to a vertical direction;
   b. a pair of laterally disposed wheels coupled to the chassis for motor-driven rotation with respect to the chassis;
   c. a sensor for measuring the tilt of the chassis;
   d. a circuit for governing wheel rotation to maintain balance of the toy on the basis of the tilt of the chassis; and
   e. a power source for powering the wheels in motor-driven rotation, the power source enclosed within a structure having dimensions less than 5 cm.

2. A balancing toy according to claim 1, further including a second sensor for measuring the angular rate of change of tilt of the chassis.

3. A balancing toy according to claim 2, wherein the second sensor is a gyroscope.

4. A balancing toy according to claim 1, further comprising a motor for driving the wheels.

5. A balancing toy according to claim 1, further comprising a first motor for driving one of the wheels and a second motor for driving another of the wheels.

6. A balancing toy comprising:
   a. a chassis incapable of supporting any person, the chassis characterized by a center of gravity;
   b. a pair of laterally disposed wheels rotatable about an axis, the wheels rotatably coupled to the chassis and the axis disposed beneath the center of gravity of the chassis;
   c. a motor for driving the wheels in such a manner as to maintain balance of the toy with respect to tipping in a fore/aft direction during operation; and
   d. a power source for powering the wheels in motor-driven rotation, the power source enclosed in a structure having dimensions less than 5 cm.

* * * * *